J. ADAMS.
PRODUCTION OF MOLDED OR SHAPED MATERIAL OR ARTICLES BY ROLLING.
APPLICATION FILED MAY 3, 1918.
1,297,773.
Patented Mar. 18, 1919.
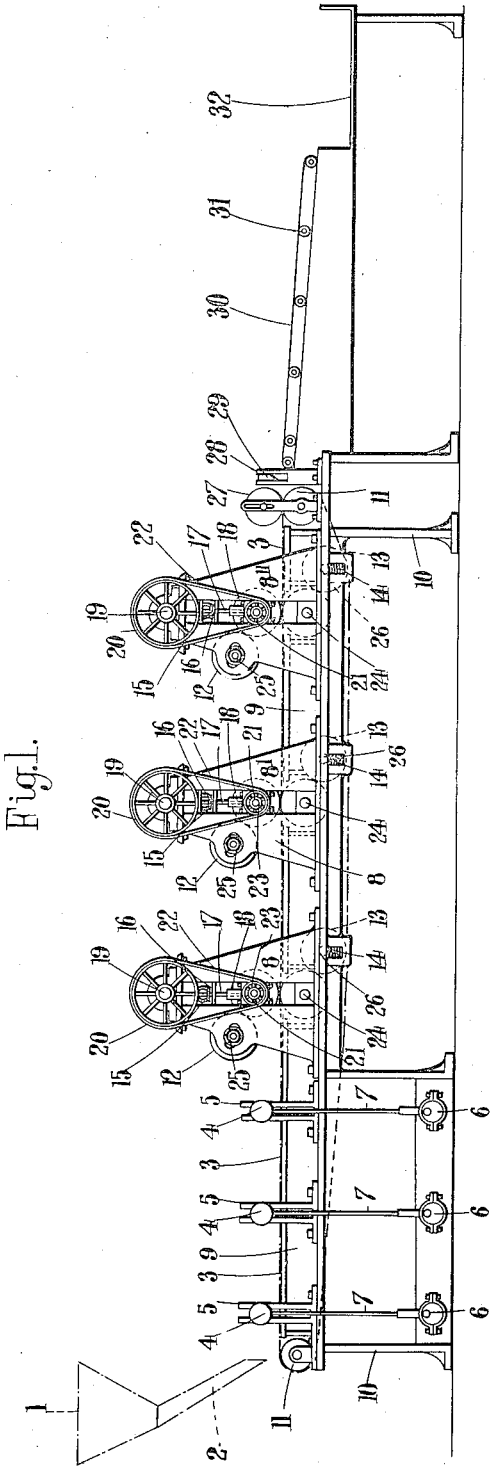
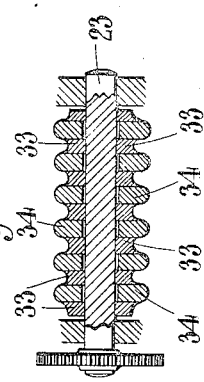
Joseph Adams
INVENTOR
by Lawrence Langner
Attorney

UNITED STATES PATENT OFFICE.

JOSEPH ADAMS, OF NORTHFLEET, ENGLAND.

PRODUCTION OF MOLDED OR SHAPED MATERIAL OR ARTICLES BY ROLLING.

1,297,773.  Specification of Letters Patent.  Patented Mar. 18, 1919.

Application filed May 3, 1918. Serial No. 232,206.

*To all whom it may concern:*

Be it known that I, JOSEPH ADAMS, a subject of the King of Great Britain, residing at Northfleet, in the county of Kent, England, have invented new and useful Improvements Relating to the Production of Molded or Shaped Material or Articles by Rolling, of which the following is a specification.

This invention relates to the production of molded or shaped material or articles by rolling and comprises improved means applicable for employment in connection with materials or substances such as asbestos or wood pulp papier-mâché or similar plastic material and also metal or the like the invention having particular reference to the rendering of the surfaces of such material or articles composed thereof undulating, wavy or corrugated.

In producing such surfaces by means of rolls as heretobefore constructed it has been observed that owing to the differential peripheral speeds of the rolling surfaces in contact with the material the latter suffers disintegration and weakening as the result of unequal treatment by the rolls the material at the ridges and depressions becoming stretched or disintegrated and weakened in a longitudinal direction so that the articles or material upon being subjected to use quickly develop cracks and breaks which soon end in fracture.

A principal object of the present invention is to provide means whereby the above mentioned defects are avoided and for the purpose of description in the present specification it is assumed by way of example that the invention is to be applied in the manufacture of corrugated roofing tiles or similar articles in which the asbestos pulp, clay or other material is operated upon while in a plastic or approximately plastic condition.

In this connection the apparatus comprises a feed chute or hopper whereby the material is fed to a traveling band or carrier suitably supported. While upon the said band the material is subjected to a beating or hammering by means of vertically reciprocating blocks or hammers in order to consolidate the same and then conducted between forming or shaping rolls whereof there may be a series so as to operate gradually upon the material. From the last rolls of the series the shaped material is conducted to a knife or separating device which detaches predetermined portions the latter being then conducted away for drying or further treatment. The rolls employed in molding or shaping the material and designed to accomplish the aforesaid object are built up of sections consisting of rings or disks adapted to form alternate ridges and depressisons. The rings or disks which are destined to form the depressions in the undulating surface of the material or article are loosely mounted while the rings or disks which are destined to form the ridges are fast on the shaft or spindle of the roll. The arrangement may however be reversed.

Thus an equalizing of the surface speed of the rolls is obtained during the performance of the rolling operation and the objectionable effects incidental to the present system of rolling avoided, the finished article being free from disintegrating cracks and breaks and presenting a solid firm and compact body.

In order that the invention may be readily understood and carried into effect same will now be fully referred to and described with reference to the accompanying drawings in which:

Figure 1 represents in side elevation an embodiment of apparatus adapted to the production of corrugated pulp or similar material or articles such as roofing tiles.

Fig. 2 is a longitudinal section illustrating the improved construction of the rolls.

The material is supplied to the hopper 1 and delivered by the feed chute 2 to a traveling band or carrier 3. The plastic material in being carried forward by the said band 3 is acted upon by beaters or hammers 4 which are operated so as to rise and fall vertically in guides 5 by means of eccentrics 6 and connecting rods 7 the shaft of the eccentric being driven by or receiving motion from any suitable source. If desired the said beaters or hammers may be operated by tappets or cams or any other suitable or convenient means the object being to effect a compacting or consolidating of the material prior to its reaching the rolls. The material is then conducted by the said band 3 to the first set of rolls 8 whereof the pressure is regulated so as to impart the initial undulating or wavy form to the material.

It may here be mentioned that the aforesaid band 3 is supported either continuously or at intervals preferably the former by a bed or table 9 supported by the framework 10 of the apparatus and there may be supporting and operating rollers 11 for the band situated at each end of the apparatus intermediate operating or suporting rollers being provided if found necessary such as when the band is required to be of inordinate length. The said bed or table 9 may be of corrugated form for the whole or a part of its length so as to accommodate the traveling band and enable the same to conform more readily to the undulating or wavy surface of the article or material in course of production.

The main operating rolls shown at 8, 8' and 8'' are associated with other rolls 12, 13 which may be composed of rubber or other resilient or elastic material and serve as wipers for the main rolls. The said rollers 12, 13 are yieldingly supported in their bearings by springs 14 so that they bear with a yielding pressure against the lower of the pairs of rollers 8, 8', 8''. The pressure of the rollers 8, 8', 8'' is preferably adjustable. A means of effecting this adjustment is indicated same consisting of a bevel wheel 15 which may be operated by hand as by a winch handle or wheel (not shown). The bevel wheel 15 gears with another bevel wheel 16 adapted to operate a screw spindle 17 which in turn operates the nut 18 to move the upper roller vertically toward or from the lower roller of the pair. The rollers are operated from the shaft 19 by belt pulleys 20, 21 belt 22 and spur gearing the spur wheels on the roller shafts 23, 24 gearing respectively with spur wheels on the shafts 25, 26 of the respective rollers 12, 13. Each set of rolls is similarly arranged for operation and the degree of pressure may be varied as between one set and the following set or sets. The pressure may moreover be intensified as regards the sets of rolls subsequent to the first set. These methods of procedure will however be readily understood without further description. The material having been subjected to the action of the rolls or sets of rolls is conducted by the traveling band 3 beneath a pressing or gravity roll 27 and thence delivered to a cutting device 28 of any suitable or convenient construction and which may be operated by hand or mechanically as described. In the drawing the cutter or knife is indicated at 29 and is assumed to be operated by hand the handle or grip not being shown. The cut lengths as they are delivered from the cutting device are then conducted by a moving band 30 working over or about rollers 31 to a trough or receptacle 32 from whence they are removed for further treatment.

The rollers employed in the machine are particularly those pertaining to the shaping or molding rolls 8, 8', 8'', are constructed in sections composed of rings or disks alternately fixed and loose upon the spindle or shaft. Referring to Fig. 2 33 indicates the rings or disks which are fast on the spindle or shaft for example the shaft 23 and which in the rolling operation produce the longitudinal ridges on the article or material 34 indicating the rings or disks loosely mounted on the said spindle or shaft and in the rolling operation serving to produce the longitudinal depressions in the article or material. Thus when two such rollers are geared together their co-action is such that a leveling up of the peripheral speed takes place so that the pressure and consolidating effect on the mass are equalized. The rings or disks 33 may be shrunk on to the shaft 23 or they may be rendered operable therewith by means of a feather and feather ways or their integrity with the shaft or spindle may be otherwise insured. The rings or disks 34 which alternate with the said rings or disks 33 will upon the rotation of the shaft 23 and consequently the rings 33 be frictionally engaged by the adjacent or contacting surfaces of the fixed rings 33 and be carried around therewith but contrary to the action of the usual construction of such rollers the loosely mounted sections will have an accommodating effect as between their peripheries and the surface of the material under operation that is to say the circumferential speed of the said roller section will be automatically adjusted to accommodate the linear speed of the material so that the latter is not subjected to any undue stretching or disintegrating of the substance thereof. When a pair of such rollers are arranged for coöperation the loosely mounted sections of one roller coincide with the fixed sections of the co-acting roll so that the peripheral speed of the co-acting sections is substantially equalized.

The effect of using rollers of the kind just above described in connection with the production of corrugated material or articles when the operation is carried out with the material in a plastic condition is such that the material or article is rendered very strong owing to the solid, firm and compact character imparted thereto.

Rollers as hereinbefore described may however be employed with equally useful results in connection with the production with corrugated material or articles composed of substances other than pulp in a plastic state. For instance in the production of corrugated metal sheeting such as the iron, steel and the like.

The apparatus and sequence of operations or some of them may be utilized in the production of flat or plain sheeting by substituting plain rolls for the corrugated or grooved rollers and by further changing the rollers and using others adapted to the purpose embossed work may be produced on the material subjected to the action of such rollers.

In the production of corrugated metal it will be obvious that the feed device would require modification and the hopper be replaced by a means of automatically delivering sheets to the traveling band or carrier, while the aforesaid hammers or stamps for consolidating the material under treatment would be dispensed with.

I claim:—

1. Apparatus for use in the production of molded or shaped material or articles by rolling in which the operating rolls are formed with alternately fixed and rotatable sections so that when two rolls are arranged for coöperation the loosely mounted sections of one roll coincide with the fixed section of the co-acting roll.

2. Apparatus for use in the production of molded or shaped material or articles by rolling comprising a traveling band or carrier means for hammering or consolidating the material and operating rolls composed of alternate fixed and revoluble sections which impart to the rolls a capability of developing varying peripheral speeds when in contact with the surface undergoing the molding or shaping operation.

3. Apparatus for use in the production of molded or shaped material or articles by rolling comprising a traveling band or carrier, means for hammering or consolidating the material and operating rolls for imparting the required form or shape to the material or article and formed with alternately fixed and rotatable sections, so that when two rolls are arranged for coöperation the loosely mounted sections of one roll coincide with the fixed sections of the co-acting roll the said rolls, being thereby adapted to develop varying peripheral speeds when in contact with the surfaces undergoing the molding or shaping operation.

4. In apparatus for the production of molded or shaped material or articles by rolling, the combination of a traveling band or carrier, means comprising vertically reciprocating blocks for hammering or consolidating the material, operating rolls composed of alternate fixed and revoluble sections adapted to develop varying peripheral speeds and means for conducting the treated material or articles away from said rolls.

5. In apparatus for the production of molded or shaped material or articles by rolling, the combination of alternately fixed and revoluble sections composed of rings or disks, the loosely mounted or revoluble sections of one roll coinciding with the fixed sections of the co-acting roll.

6. In apparatus for the production of molded or shaped material or articles by rolling, the combination with the roller spindle of sections fixed thereto and rotatable therewith and other sections alternating with the said fixed sections and rotatable on the said spindle independently of said fixed sections.

7. In apparatus for the production of molded or shaped material or articles by rolling, the combination of a traveling band or carrier, a hopper or feed chute for supplying material to said band, supporting and operating rollers for said band, hammers for consolidating the material as it moves along with said band, means for operating the said hammers, operating rolls composed of alternately fixed and revoluble sections, means for regulating the pressure of said rolls, wiper rolls for clearing the surfaces of the operating rolls, a cutting device for severing predetermined lengths of the material as it issues from the operating rolls, and means for conveying said cut lengths away and a receptacle for said cut lengths.

8. In apparatus for the production of molded or shaped material or articles by rolling, the combination of means for hammering or consolidating the material and operating rollers composed of alternately revoluble and fixed sections relatively to the roller spindle each revoluble section being adapted to coöperate with a fixed section of the co-acting roller.

9. In apparatus for the production of molded or shaped material or articles by rolling, the combination of a traveling band or carrier, hammers or tappers for consolidating the material, means for actuating said hammers, operating rolls composed of sections alternately revoluble and fixed relatively to the roller spindle and to each other, each revoluble section being adapted to coöperate with a fixed section of the co-acting roller.

JOSEPH ADAMS.